(12) United States Patent
McCoy (10) Patent No.: US 7,140,500 B2
(45) Date of Patent: Nov. 28, 2006

(54) CABLE RACK FOR POWER AND COMMUNICATION CABLES

(75) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 267 days.

(21) Appl. No.: 10/975,659

(22) Filed: Oct. 28, 2004

(65) Prior Publication Data

US 2006/0091088 A1    May 4, 2006

(51) Int. Cl.
A47F 7/00    (2006.01)
(52) U.S. Cl. .................................................... 211/60.1
(58) Field of Classification Search ............... 211/60.1, 211/70.4, 186, 189, 193, 194, 86.01
See application file for complete search history.

(56) References Cited

U.S. PATENT DOCUMENTS

| | | | |
|---|---|---|---|
| 918,039 A | 4/1909 | Grundmann | |
| 1,462,670 A | 7/1923 | Vance | |
| 1,473,817 A | 11/1923 | Gorsline | |
| 1,598,727 A * | 9/1926 | Jones | 248/159 |
| 1,622,741 A | 3/1927 | Seeger | |
| 1,850,079 A | 3/1932 | Karnes | |
| 1,905,908 A | 4/1933 | Karnes | |
| 1,940,454 A | 12/1933 | Karnes | |
| 2,008,180 A | 7/1935 | Karnes | |
| 2,462,399 A | 2/1949 | Hinchman | |
| 2,615,666 A | 10/1952 | Jones | |
| 2,686,643 A | 9/1954 | Bloom et al. | |
| 2,849,027 A | 8/1958 | Tetyak | |
| 2,937,833 A | 5/1960 | Sachs | |
| 3,164,255 A * | 1/1965 | Jay | 211/60.1 |
| 3,165,205 A * | 1/1965 | Travis, Jr. | 211/60.1 |
| 3,355,132 A | 11/1967 | Jenkins | |
| 3,503,519 A * | 3/1970 | Jay | 211/60.1 |
| 3,523,667 A | 8/1970 | Guerrero | |
| 3,601,432 A | 8/1971 | Fenwick et al. | |
| 3,730,108 A | 5/1973 | Stroh | |
| 3,787,016 A | 1/1974 | Laval, Jr. | |
| 3,794,183 A * | 2/1974 | Colbridge | 211/208 |
| 3,856,246 A | 12/1974 | Sinko | |
| 3,888,440 A | 6/1975 | Rebentisch | |
| 3,923,277 A | 12/1975 | Perrault et al. | |
| 3,964,707 A | 6/1976 | Lewis | |
| 4,183,484 A | 1/1980 | Mathews | |
| 4,244,542 A | 1/1981 | Mathews | |
| 4,306,697 A | 12/1981 | Mathews | |

(Continued)

Primary Examiner—Sarah Purol
(74) Attorney, Agent, or Firm—Reinhart Boerner Van Deuren P.C.

(57) ABSTRACT

A cable rack suitable for underground service is made from at least one plastic molded stanchion and a cross-arm. A height of the rack may be adjusted by stacking the stanchions lengthwise, in tandem, and by trimming the stanchions as desired. The best places in the stanchion for trimming are indicated with molded-in visual indicators. The cross-arms, which may be used to span two stanchions, are designed so that a user receives a visual indication from the stanchion when the cross-arm is fully seated and ready to receive a load of communications cables, power cables, or both. In a preferred embodiment, each stanchion has an aperture for attaching to a wall near a top of the stanchion. Plastic cable ties may be used to secure small cables to the stanchions without a cross arm, and may also be used to lock cross arms into the stanchions.

41 Claims, 6 Drawing Sheets

U.S. PATENT DOCUMENTS

| | | |
|---|---|---|
| 4,324,379 A | 4/1982 | Ovitz, III |
| 4,387,872 A | 6/1983 | Hogue |
| 4,406,374 A | 9/1983 | Yedor |
| 4,494,896 A | 1/1985 | DiFranco |
| 4,557,446 A | 12/1985 | Barron |
| 4,601,447 A | 7/1986 | McFarland |
| 4,709,888 A | 12/1987 | Cubit et al. |
| 4,960,253 A | 10/1990 | Perrault et al. |
| 5,022,621 A | 6/1991 | Quest |
| 5,092,546 A | 3/1992 | Wolfbauer |
| 5,375,726 A | 12/1994 | Lechleiter |
| 5,538,213 A | 7/1996 | Brown |
| 5,605,419 A | 2/1997 | Reinert, Sr. |
| 5,918,750 A | 7/1999 | Jackson |
| 5,918,837 A | 7/1999 | Vicain |

\* cited by examiner

FIG 13

CABLE RACK FOR POWER AND COMMUNICATION CABLES

FIELD OF THE INVENTION

The technical field of the invention is that of racks for supporting power and communication cables in underground manholes, vaults, and tunnels.

BACKGROUND

Cables for electric power and for communication lines are run underground in order to protect them from above-ground elements and from the interference and damage they would suffer when installed above the ground or on poles or structures. The underground environment may be less hostile in some ways, but the history of underground cables suggests that the underground environment is not to be considered benign. The environment in underground power and communications manholes is indeed harsh.

While there may be fewer ultraviolet rays and less severe weather underground, and the temperature is more constant, moisture and humidity are always a consideration. There are other considerations, such as the constant and higher danger from flooding, and underground pests that consider electrical insulation, and even steel, a tasty treat. Manholes may fill with water that is often contaminated with sewage, fertilizer runoff, tree roots, and chemicals, including caustic materials. Very harsh sea or salt water sometimes fills manholes. Many manholes are completely or partially filled with such contaminated water all of the time, except when pumped out for maintenance. Others fill periodically but are hot and have extremely high humidity, while still others fill and empty with ocean tides.

Thus, at a minimum, communication and power cables must be kept off the ground, organized, and protected to the greatest extent possible. Cables are thus typically supported underground by racks that elevate cabling and keep the cabling off the ground, thus shielding the cables from at least some of the worst underground dangers. Once the decision is made to go underground, the underground environment must then be faced. Racks for supporting cables must be able to withstand both heat and cold, all conceivable temperatures and humidities in every combination. In addition, the racks must be able to support very heavy and steady loads from power and communication cables. The racks themselves are preferably supported, e.g., attached to a wall, rather than free-standing structures. Thus, the racks will have penetrations, or stress concentrators, to deal with, in these hot, humid, and stressful environments, along with the high loads expected from supporting cabling. The walls themselves will also have penetrations, supporting the bolts or other fasteners used to secure the racks in place. The walls, such as concrete walls or other structures, will also be in intimate contact with the racks, adding their chemical potential for corrosion to the racks.

All these stresses combine to make the underground a challenging environment for cable racks. In the past and still today, many underground cable racks and fasteners are made from hot dipped galvanized steel. The steel arms and posts are bonded together and grounded in an attempt to prevent galvanic corrosion. Galvanic corrosion is caused by a difference in the electrical potential between the galvanized steel and the surroundings, including the manhole and any water in the manhole. Eventually, the galvanized coating is consumed and the steel racks may oxidize or corrode away, leaving the power and communications cables without support.

What is needed are cable racks better able to withstand the environment, and better able to tailor themselves to a greater variety of situations, for fewer stresses, and for longer service.

BRIEF SUMMARY

One aspect of the invention is a cable rack. The cable rack includes at least one stanchion, wherein the at least one stanchion further includes joining portions at a top and a bottom of the stanchion, and at least two apertures for holding and at least two apertures for attaching, wherein the joining portions at the top are one of male and female and the joining portions at the bottom are the other of male and female. The cable rack also includes at least one arm with two vertically-spaced brackets, for holding in place in the at least one stanchion with the at least two apertures for holding, wherein the at least one stanchion and the at least one arm are molded from plastic, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures, and one of the apertures for attaching is located near a top of the at least one stanchion.

Another aspect of the invention is a plastic cable rack. The plastic cable rack includes at least one rack arm and at least one stanchion. The at least one stanchion also includes at least two apertures for attaching and at least two apertures for holding the at least one arm, wherein the distance from an upper side of a top-most holding aperture and a top surface of the stanchion, and a distance from a top surface of a lowest holding aperture to a bottom surface of the stanchion is equal to a distance between corresponding surfaces of two adjacent holding apertures, wherein one of the apertures for attaching is located near a top of the at least one stanchion.

Another aspect of the invention is a plastic cable rack molded from plastic. The plastic cable rack includes at least one rack arm with vertically-spaced brackets, and at least one stanchion. The stanchion has at least two apertures for attaching the stanchion, and at least two holding apertures for holding the at least one arm, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures.

Another aspect of the invention is a cable rack molded from plastic. The cable rack includes at least one rack arm with vertically-spaced brackets, and at least one stanchion having at least two apertures for attaching the stanchion and at least two holding apertures for holding the at least one arm. The at least one stanchion has two apertures for holding for each aperture for attaching, except that a single aperture for attaching has a single aperture for holding, and wherein all holding apertures are equidistant from each other.

Another aspect of the invention is a cable rack molded from plastic. The cable rack has at least one rack arm and at least one stanchion, the at least one stanchion having at least two apertures for attaching and at least two apertures for holding the at least one rack arm, and when the at least one rack arm is installed in the at least one stanchion, a space between an upper surface of the rack arm and an upper surface of the aperture for holding is equal to a width of a cable tie or a width of a head of a cable tie.

Another aspect of the invention is a cable rack molded from plastic. The cable rack includes at least one stanchion having at least two apertures for attaching and at least two apertures for holding, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures.

There are many other aspects of the invention, of which only a few are described below.

DETAILED DESCRIPTION OF THE DRAWINGS AND THE PRESENTLY PREFERRED EMBODIMENTS

Embodiments of the present invention are preferably molded from plastic materials. In this context, "plastic" materials include any resinous, thermoset, or thermoplastic materials, including materials that are reinforced, foamed, or otherwise altered, and which are formed by molding. Thus, in one embodiment, nylon with short glass fibers is used to make strong, stiff, and environmentally-resistant stanchions and rack arms. Other embodiments may use less costly materials, such as polyethylene or polypropylene, for applications in which not as much strength is required. The plastic materials may also include particulate fillers, such as aluminum oxide or calcium carbonate, or any other filler useful in plastics molding.

Underground cable racks face several constraints for successful service. One of these constraints is that the stanchions or posts generally include penetrations so that the stanchions or posts may be attached to the walls or surfaces of the manholes or other underground installations in which they are placed. If cable rack arms are not integral with the stanchions, there are then more penetrations so that the rack arms may be installed, to hold cables for power or communications. Each such penetration may be considered as a stress concentrator, a point in the structure at which stresses will be more likely to cause failure.

In molded posts or stanchions, the effects of the stress concentrators may at least be minimized by molding in the penetrations or holes, so that the well-known "skin-effect" of plastic materials will apply, lessening the effect of the stress concentration. The skin-effect of as-molded plastics means simply that there is a barrier layer of resin on the surface, resistant to infiltration of water. Embodiments of the present invention mold in a number of important features to take advantage of the skin effect and to make the stanchions as useful as possible.

Figure 1:
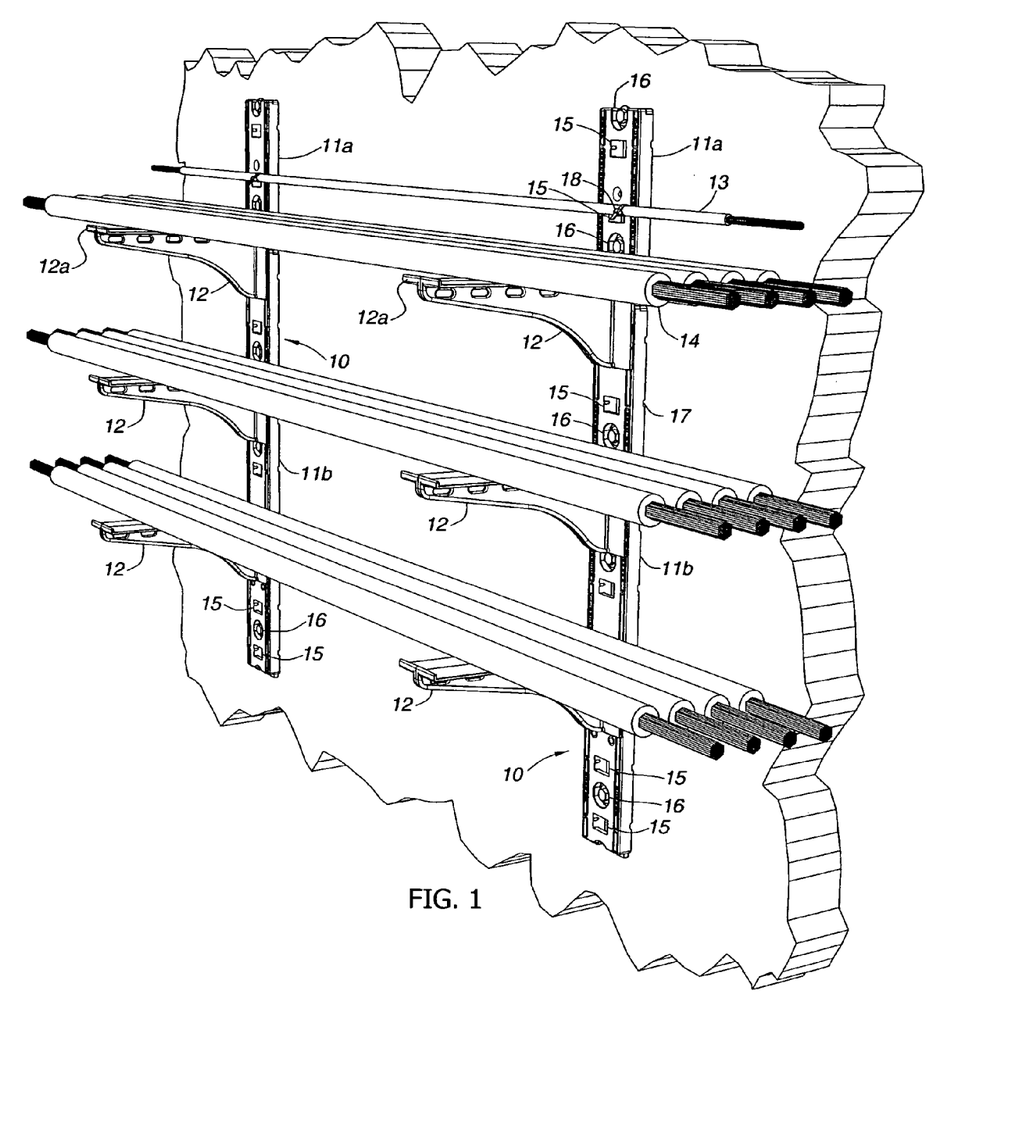
FIG. 1 is a perspective view of stanchions with rack arms in a typical underground installation with embodiments of the present invention.

A first embodiment of the invention is depicted in FIG. 1, which depicts an underground cable installation with four molded stanchions 11a, 11b. Stanchions 11a, 11b are installed in tandem, with upper stanchions 11a installed atop lower stanchions 11b, and are shown in two adjacent tandem columns 10. In this embodiment, the upper and lower stanchions are similar but of different lengths and are identified separately for clarity. The interface between the stanchions is hidden in FIG. 1 and will be made clearer in the description below. Stanchions are desirably mounted in tandem, one atop another, as shown, when there are a large number of cables and the manhole ceiling is relatively high.

Each column 10 includes a shorter upper stanchion 11a, a longer lower stanchion 11b, and three cross arms 12 for holding power cables 14, communication cables, or both. A lighter, smaller cable 13 or bundles of cables or wires, separate from the cables that are supported by the cross arms, may be secured to stanchion 11a with a cable tie 18 through holding aperture 15. Cable 13 may be communications cables. Communications and power cables, secured to the stanchions by cross arms or by cable ties, are preferably separated from each other. Stanchions 11a, 11b may include holding apertures 15 for installing cross arms, and attaching apertures 16 for bolting the stanchions to a wall or other structure in the underground installation. While the stanchions and cross-arms are most useful for underground use, there is no reason why they cannot be used in other ways, such as for aboveground or even mobile power or utility installations. As depicted in FIG. 1, and best seen toward the bottom portion of FIG. 1, there are preferably two holding apertures 15 straddling each attaching aperture 16, except at the top of the stanchion, where there is a single attaching aperture 16 for a single holding aperture 15.

Figure 2:
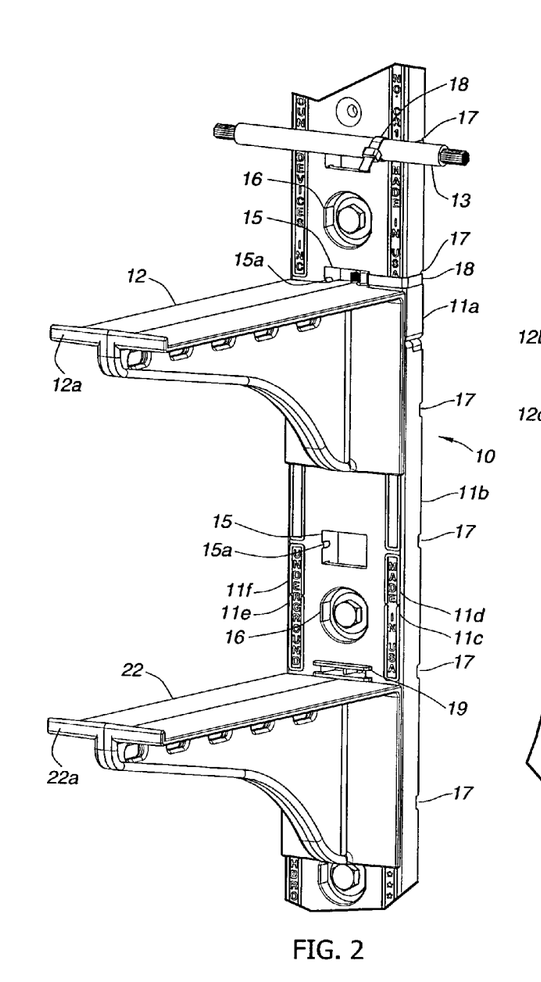
FIG. 2 is a perspective view of two stanchions joined vertically, and two rack arms.

A closer view of column 10 is shown in FIG. 2. Upper cross arm 12 is seen to span upper stanchion 11a and lower stanchion 11b. The split line between stanchions is visible just below the numeral "11a" in FIG. 2. The ability of an arm to span two stanchions increases the cable rack's versatility by permitting an arm adjustment position that straddles two stanchions. Identical cross arms 12, 22 have lips 12a, 22a at one end to help retain the cables or other load placed on the cross arms. Holding apertures 15 are rectangular with rounded corners, well known to those skilled in molding arts, the corners preferably radiused from about 0.005" to about 0.060" or more to avoid stress concentrations and cracking to the greatest extent possible. Holding apertures 15 preferably include a small projection 15a on one side of the aperture, for creating an interference fit when cross arms 12, 22 are installed. As best seen in the upper portion of FIG. 2, the projection 15a can be seen when cross arm 12 is properly seated.

Attaching apertures 16 are molded in circular or elliptical form, to easily distinguish attaching apertures 16 from holding apertures 15. In other embodiments, their shapes may be reversed, or may be the same, or may take on other shapes as desired. As best seen in the lower portion of FIG. 2, a barbed spring clip 19 may be installed in the space remaining in aperture 15 after cross-arm 22 is mated with stanchion 11b. Although not shown in FIG. 2, a barbed spring clip may also be used to secure cross arm 12 in place. Stanchions 11a, 11b may also include recesses 17 for attaching cable 13 by means of cable tie 18. The recesses and the wall to which the stanchion is attached create an aperture through which the cable tie is threaded. Cable tie 18 may also secure cross-arm 12 in place by providing a positive lock. The head of the cable tie is lodged in place between the upper surface of aperture 15 and the upper surface of arm 12.

Stanchions 11a, 11b may be molded in various sizes, such as different lengths or widths, and with other features deemed desirable for their use. Thus, stanchions 11a, 11b may be molded in standards sizes, such as 2 feet (24 inches long) or 3 feet (36 inches long), 3 inches or 4 inches wide, and 1" thick. Other lengths, widths, or depths may be used as desired, including metric sizes. In order to minimize the number of tools necessary to please a large number of customers, the stanchions may also be designed for custom tailoring. Thus, it is preferable that stanchion embodiments of the present invention may be field cut without losing all the benefits of a molded product.

Accordingly, stanchions may be molded with visual indicators of locations where field cutting is most desirable, or least deleterious, for the stanchion. FIG. 2 depicts molded-in bosses or lettering 11c, 11d on one side of the front portion of stanchion 11b, and molded-in bosses or lettering 11e, 11f on the other side of the front portion of stanchion 11b. The gap between 11c and 11d, and the gap between 11e and 11f is a visual indicator to a user of where the stanchion may best be field cut if it is desired to alter the length of a stanchion. Of course, plastic (or even metallic) posts or stanchions may be cut in virtually any location, but the stanchion is preferably designed so that cutting takes place at a designated location where the resulting segment can best be used in tandem with another stanchion. In addition, the top surfaces of bosses 11d and 11f may be used to visually indicate when a cross-arm has been properly seated in holding apertures. Only the top surfaces of bosses 11d, 11f are visible when the cross-arm is properly seated, as shown in FIG. 2.

Figure 3:
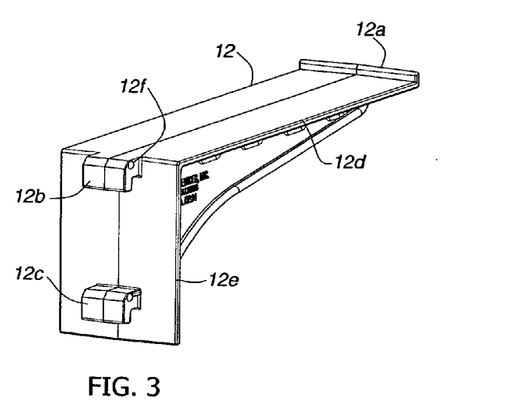
FIG. 3 is a rear perspective view of a rack arm.
Figures 12, 13:
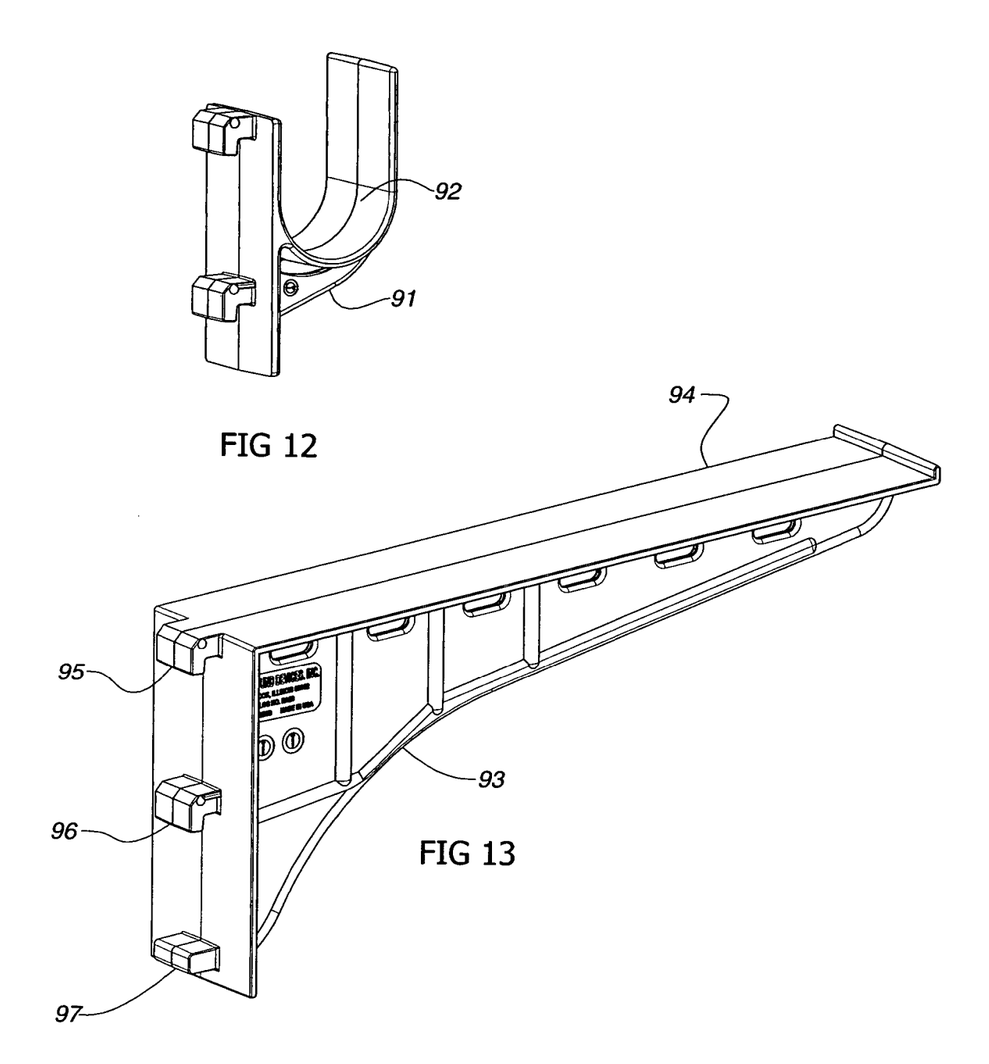
FIGS. 12 and 13 depict alternate embodiments of cross arms.

In order to most effectively utilize stanchions in tandem, one atop another, the cross-arms are designed to fit precisely into the holding apertures of the stanchions. An embodiment of a cross arm is depicted in FIG. 3. Other sizes and shapes of cross arms may be used with other features deemed desirable to please a large number of customers, as exemplified in FIGS. 12 and 13. In FIG. 3, cross arm 12 has a relatively flat surface 12d and a slight lip 12a at one end. In FIG. 12, arm 91 has a saddle portion 92 for firmly securing round cables. In FIG. 13, cross arm 93 has an elongated portion 94 and two brackets 95, 96 for securing cross arm 93 in a stanchion. Cross arm 93 also has a horizontal stand-off 97 so the cross arm will not sag but remains in a horizontal orientation when heavily loaded.

Figure 3A:
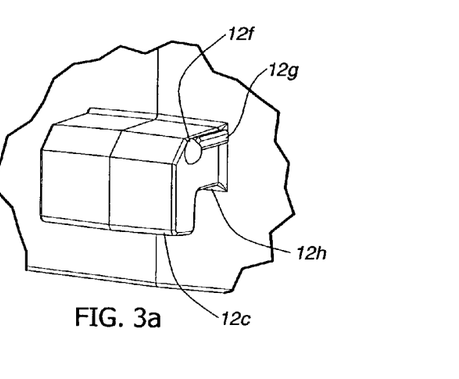
FIG. 3a is a partial view of a bracket from the rack arm of FIG. 3.

One embodiment of a cross arm 12 is depicted in FIGS. 3 and 3a. Cross arm 12 with lip 12a has a horizontal portion 12d for holding cables or other loads placed on the arm, and a vertical portion 12e for interfacing with a stanchion. Vertical portion 12e includes two brackets 12b, 12c, each bracket having a projection. Projections may be a small, rounded dot 12f as shown on bracket 12b in FIG. 3, or may take on other forms. In FIG. 3a, bracket 12c has a projection that includes a dot 12f and a continuation rounded rectangle 12g, which may be the same height as dot 12f or may be a lesser height. In one embodiment, the projections have a maximum height of 0.075 inches; in other embodiments, the maximum height may be about 0.050 inches. Other heights may be used.

The purpose of the projections is to create a slight interference fit and to reduce play when the cross arm is installed into a stanchion, or when the cross arm bridges two stanchions. In this embodiment, cross arm 12 has two different projections, one of which is dot 12f and the other of which is dot 12f and continuation 12g. The interference fit may occur only when the cross arm is being assembled, or the interference fit may be designed to continue after assembly. If interference continues after assembly, the joint may be known as a "friction fit."

Such friction fits tend to increase the stability of the joint and resist upward movement of the cross arm. This resistance is important, because many communications cables use splice cases to enclose sections where the cables are spliced together (not shown). Splice cases are typically rectangular or cylindrical in form, may be from seven to twelve inches in diameter, or more, and may be up to three feet or more in length. Splice cases are typically molded from plastic materials, or fabricated from stainless steel, or a combination of both. Splice cases are filled with pressurized air to resist ingress of water, and may thus be lighter than water. Splice cases are typically anchored to cross-arms, so that when a manhole fills with water, the buoyant splice cases can create an upward load on the cross-arms, tending to lift the cross arms from the stanchions or posts. Friction fits reduce the likelihood that the cross arms will be lifted out of the stanchions, allowing the splice cases and cables to fall to the ground when the water eventually drains from the manhole.

Figure 4:
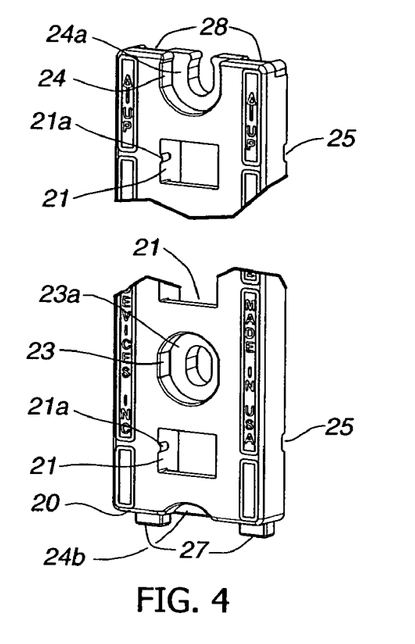
FIG. 4 is a front perspective view of a stanchion according to embodiments of the present invention.
Figure 5:
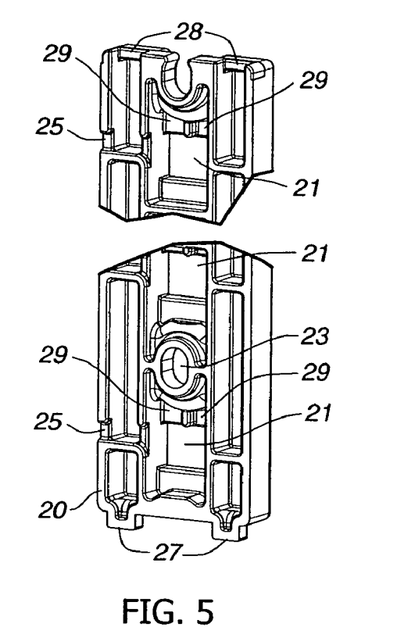
FIG. 5 is a rear perspective view of the stanchion of FIG. 4.

The stanchion embodiments of the present invention are depicted in closer view in FIGS. 4 and 5, which depict front and rear views respectively. Stanchion 20 includes rounded rectangular holding apertures 21. Aperture 21 includes a projection 21a for creating an interference fit when a cross-arm is assembled into the stanchion. In one embodiment, projection 21a is a rounded or half-cylinder with a maximum height of about 0.075 inches. Other shapes and other maxima may be used instead. The stanchion also includes circular or elliptical attaching apertures 23 and 24, used for attaching the stanchion to a nearby installation feature, such as a wall. Attaching apertures 23, 24 may include recesses 23a, 24a for holding a washer or a bolt head used to fasten the stanchion to a wall. For all but the top-most attaching aperture on each stanchion, there are two holding apertures for each attaching aperture.

The stanchions are designed so that the distance between adjacent holding apertures 21 is equal to or very close to the distance between brackets in the cross arms discussed above. This distance, from the bottom of one holding aperture to the bottom of the adjacent holding aperture, is known as the vertical adjustment. In instances where two stanchions are joined, the stanchions are designed so that the distance between the top holding aperture in the bottom stanchion and the bottom holding aperture in the top stanchion is also equal to or very close to the distance between brackets in the cross arms. This allows for ready installation of cross arms in a single stanchion, and also in joined or tandem stanchions. It has also been discovered that using the cross arm to bridge two stanchions in this manner adds to the stability of the assembled stanchions. Although a fastener or bolt and the male and female joining portions provide the primary support for joining the stanchions, the cross arm also serves to stabilize the two joined stanchions.

As best seen in FIGS. 4 and 5, the stanchion may include joining portions, preferably at the top and bottom of the stanchion. In one embodiment, the joining portions include male tabs 27 on the bottom and female slots 28 on the top so that the stanchion may be used in tandem, i.e., one stanchion assembled atop another. As mentioned above, the stanchions may be produced in several lengths, so that a user may tailor an installation height by selecting the appropriate lengths of stanchions. In this embodiment, tabs 27 and mating slots 28 are placed to the rear of the stanchion, so that when assembled, the front face of the combined stanchions forms a straight line and does not interfere with installation of cross arms, as depicted in FIG. 1.

The tabs and slots are preferably designed with a slight draft angle (about 0.25° to about 2°) and with a slight interference (0.0005" to about 0.002") so that when two stanchions are joined, they also form a friction fit. The draft angle allows for easy disassembly. Other angles and fits may be used. Recesses 25 for cable ties are also seen in both FIGS. 4 and 5. Finally, when two stanchions are joined, a fastener or bolt is preferably used to secure the stanchions to a wall or other support structure. The bolt or fastener fits into aperture 24 at the top of the lower stanchion, and the small aperture 24b at the bottom of the top stanchion.

Figure 6:
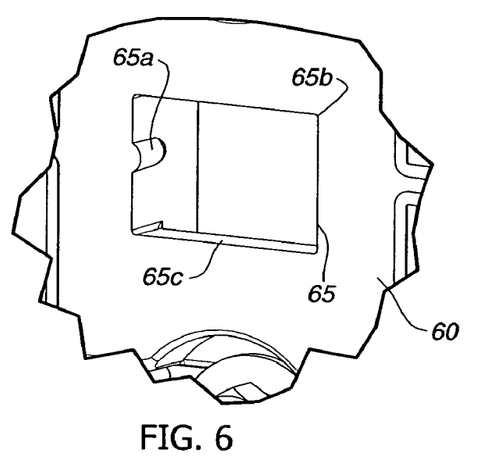
FIG. 6 is a front perspective view of a holding aperture in a stanchion.

A holding aperture for holding a cross arm in a stanchion is depicted more closely in FIG. 6. Stanchion 60 includes at least two holding apertures 65 for holding a cross arm. Aperture 65 is in the form of a rounded rectangle, the corners 65b radiused to at least 0.005 inches, and preferably 0.060 inches or more, to avoid stress concentrations and cracking. The aperture includes a projection 65a, in this case in the form of a cylinder or half-cylinder, to create an interference fit with a bracket of a cross arm when the bracket is placed into aperture 65. As may be seen in FIGS. 3 and 3a, there is preferably a longer projection 12g on at least one bracket of each cross arm to provide an interference fit for the assembly of the cross arm into the holding apertures. The heights of the projections on both the brackets and the apertures are chosen so that a person assembling the arm to the stanchion must exert effort to overcome the interference to complete the assembly. Once assembled, however, the interference will resist forces tending to cause disassembly, such as loads on cross arms and rocking of the stanchions in place.

In addition to resisting disassembly, the projections are also useful as a visual indicator to a user that the cross arm has been correctly assembled. As best seen in FIG. 2, cross arm 12 is correctly assembled into stanchions 11a, 11b when projection 15a is visible in upper holding aperture 15. If the cross arm has not been correctly assembled by pushing down on the cross arm and its brackets, the projection or visual indicator 15a will not be visible. The brackets are designed so that when the correct depth of installation is achieved, the underside 12h of the bracket meets the lower surface 65c of the holding aperture, as best seen in FIGS. 3a and 6.

Figure 7:
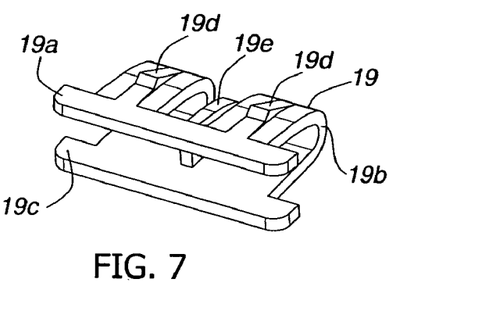
FIG. 7 is a perspective view of a barbed spring clip useful in embodiments of the present invention.

FIG. 2 also depicts the use of a barbed spring clip 19 to positively lock arm 22 into an aperture (not shown) of stanchion 11b. The upper bracket of the cross arm and barbed spring clip 19 fit into a holding aperture that may be very similar to holding aperture 15. A barbed spring clip suitable for this purpose is depicted in FIG. 7. Barbed spring clip 19 is molded from relatively stiff plastic, such as polycarbonate, and may include stiffeners, such as glass fibers, so that barbed spring clip 19 has a high spring constant and requires a considerable effort to bend flanges 19a, 19c, about center 19b.

When the barbed spring clip is bent and fully installed in aperture 15 between the upper surface of the upper arm bracket and the upper edge of the stanchion holding aperture, barbed spring clip 19, which was compressed during the insertion procedure, opens, causing the upper surface of upper flange 19a to press against the upper edge of the holding aperture, the lower surface of lower flange 19c to press against the upper face of the upper arm bracket, and the barbs 19d to latch into pockets 29 provided on the rear of the stanchions, as shown in FIG. 5. The latching of the barbs into the pockets secures barbed spring clip 19 in the stanchion holding aperture.

Vertical block 19e is located in the center of the barbed spring clip and is an integral part of the barbed spring clip, providing the positive lock and preventing the arm from coming out of the stanchion under load. Barbed spring clip 19 is removable and reusable. To remove the barbed spring clip, the user presses down with some effort on upper flange 19a, causing barbs 19d to disengage from the pockets in the rear of the stanchion, and permitting barbed spring clip 19 to be withdrawn from the stanchion holding aperture. The spring need not take on the shape depicted in FIGS. 2 and 7, but may take on any convenient shape for providing a compressive load to resist disassembly.

Figure 8:
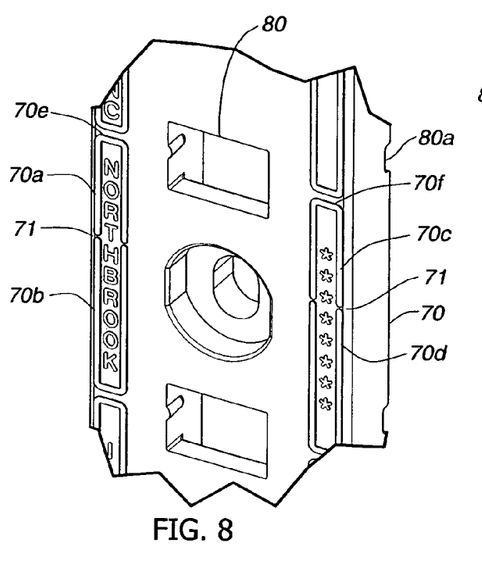
FIGS. 8 and 9 are front and rear perspective views of another stanchion embodiment.
Figure 9:
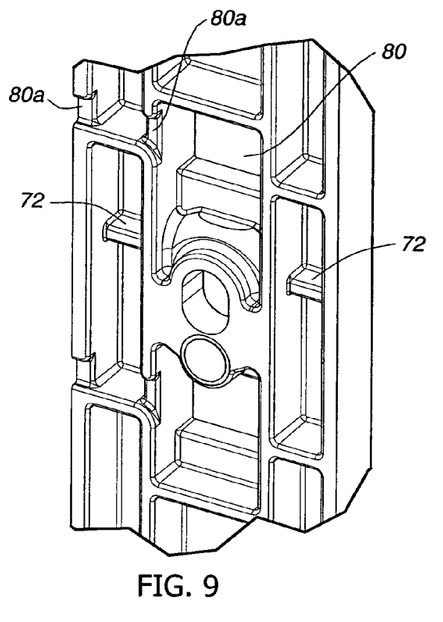

Another embodiment of a stanchion is depicted in FIGS. 8 and 9, which depict front and rear views, respectively, of the stanchion. In this embodiment, stanchion 70 uses a different visual indicator for field cutting of the stanchion, as shown in the front view, FIG. 8. The visual indicator is a small gap 71 between lettered bosses, 70a, 70b, 70c, 70d, on opposite sides of the front of the stanchion. Gap 71 is placed on the front so that a perpendicular field cut will avoid reinforcing bosses 72, as shown on the rear of the stanchion, FIG. 9. Thus, after a field cut, bosses 72 will be intact and in the correct position, so that the resulting field-cut stanchion segment has all the tandem installation capabilities of a non-field-cut stanchion. Stanchion 70 preferably has at least one recess 80a to accommodate cable ties for securing cabling to the stanchion.

Figures 10, 11:
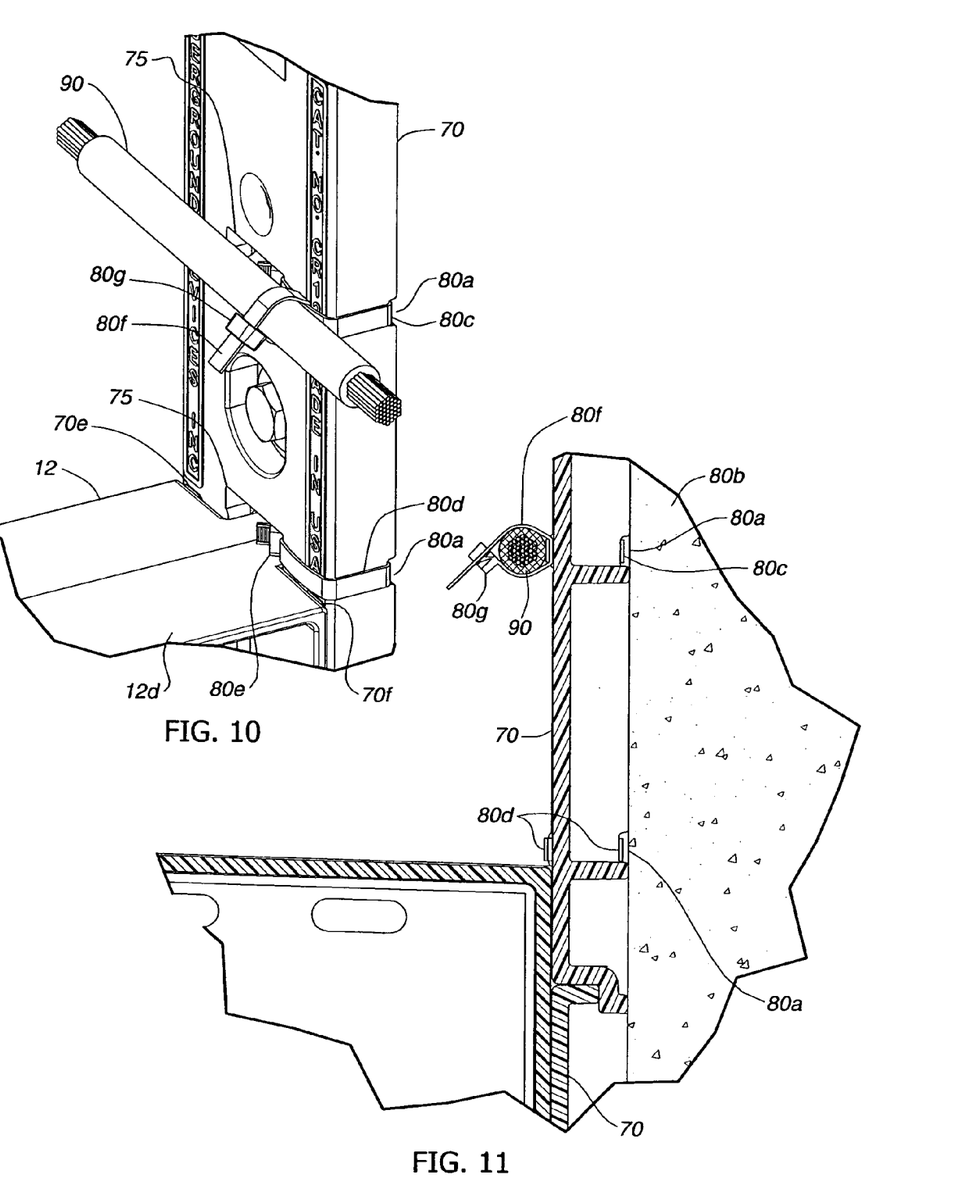
FIG. 10 is a perspective view of a stanchion using cable ties to lock a cross arm in place and to secure cabling to the stanchion.
FIG. 11 is a cross-sectional view of the embodiment of FIG. 10.

Another visual indicator of proper installation is depicted in FIG. 10. When the cross arm 12 is properly seated in holding apertures 75 (only one shown in FIG. 10) in stanchion 70, cross-arm horizontal portion 12d is substantially aligned with the tops 70e, 70f of molded-in bosses 70a, 70c, as shown in FIG. 8. Only the very tops of the molded-in bosses are visible when the arm is properly seated, and most of the bosses are concealed by cross arm 12. As noted above with respect to FIGS. 3a and 6, proper seating of the cross arm also means that lower surface 12h is seated adjacent lower portion 65c of holding aperture 65.

The stanchions depicted are more useful if it is convenient to add small cables or wires during or after installation. The recesses discussed above, and cable ties that take advantage of the recesses, make the stanchions easier to use and more convenient. Referring to FIGS. 9–11, every holding aperture 80 preferably has a slight recess 80a in the rear of the stanchion 70. FIG. 10 is a right front perspective view, and FIG. 11 is a cross-sectional view. When stanchions 70 are attached to a wall 80b, the wall and the recess 80a form a small cross aperture that connects to the adjacent holding aperture 75. Each cross aperture or recess 80a allows a cable tie 80c, 80d to be placed in the recess. Each cable tie, 80c, 80d is threaded through the cross aperture, through the holding aperture, and through the head of the cable tie, and is cinched into place. Cable ties typically include a head that incorporates a locking pawl, which does not allow the cable tie to come loose. Cable ties typically are placed so that the head is completely inside aperture 75 when cinched.

As best seen in FIG. 10, the heads 80e of cable ties 80c, 80d are placed into apertures 75. The cable tie width preferably matches the height of recess 80a so that when the cable tie is cinched in place, a positive lock is created to prevent the cable tie from moving, further locking arm 12 into stanchion 70. Cable ties 80c, 80d are removable by cutting, and are not reusable after cutting. As also shown in FIGS. 10–11, the cable ties may be used to secure a small power and/or communication cable 90 to stanchion 70. First cable tie 80c is installed as described above, and second cable tie 80f is threaded vertically between cable tie 80c and the front of the stanchion. Second cable tie 80f is then wrapped around cable 90, and cinched tightly in place using head 80g of second cable tie 80f.

There are many possible embodiments of the present invention, of which only a few have been described herein. It is intended that the foregoing detailed description be regarded as illustrative rather than limiting, and that it be understood that it is the following claims, including all equivalents, that are intended to define the spirit and scope of this invention.

What is claimed is:

1. A cable rack, comprising:
    at least one stanchion, wherein the at least one stanchion further comprises joining portions at a top and a bottom of the stanchion, and at least two apertures for holding and at least two apertures for attaching, wherein the joining portions at the top are one of male and female and the joining portions at the bottom are the other of male and female; and
    at least one arm with two vertically-spaced brackets, for holding in place in the at least one stanchion with the at least two apertures for holding, wherein the at least one stanchion and the at least one arm are molded from plastic, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures, and one of the apertures for attaching is located near a top of the at least one stanchion.

2. The cable rack of claim 1, wherein the apertures for attaching are recessed for receiving fasteners to attach the at least one stanchion to a structure.

3. The cable rack of claim 1, wherein the apertures for holding each comprises a projection for an interference fit with the at least one arm.

4. The cable rack of claim 1, wherein at least one of the brackets comprises a projection for a friction fit with the apertures for holding.

5. The cable rack of claim 1, wherein the stanchion further comprises a visual indicator that the arm has been properly seated into the stanchion.

6. The cable rack of claim 1, wherein the stanchion further comprises at least one visual indicator for trimming a length of the stanchion.

7. The cable rack of claim 1, wherein the stanchion further comprises at least one recess or aperture for attaching a cable tie.

8. The cable rack of claim 7, wherein the at least one recess or aperture for attaching a cable tie is sized a width of a cable tie.

9. The cable rack of claim 1, wherein the at least one stanchion comprises two stanchions, the arm is assembled with one bracket in each stanchion, and the apertures for holding are spaced equally in a single stanchion and in two stanchions.

10. A plastic cable rack, comprising:
    at least one rack arm; and
    at least one stanchion, wherein the at least one stanchion further comprises at least two apertures for attaching and at least two apertures for holding the at least one arm, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures, and wherein one of the apertures for attaching is located near a top of the at least one stanchion.

11. The cable rack of claim 10, wherein the at least one stanchion comprises a first and a second stanchion, the first and second stanchions to be joined lengthwise by at least one tab projecting from a bottom surface of the first stanchion and by at least one mating slot in a top surface of the second stanchion.

12. The cable rack of claim 11, wherein the at least one arm is attached to the at least one stanchion by a first aperture in the first stanchion and a second aperture in the second stanchion, at least one of the first and second apertures comprising a projection for an interference fit with the arm, and wherein a distance between the first aperture in the first stanchion and the second aperture in the second stanchion is the same as a distance between two adjacent apertures for holding in a single stanchion.

13. The cable rack of claim 10, wherein the at least one stanchion further comprises at least one visual indicator for trimming a length of the stanchion, the indicators located immediately above a horizontal boss at a rear of the stanchion.

14. The cable rack of claim 10, wherein the at least one stanchion further comprises at least one visual indicator for trimming a length of the stanchion, the at least one visual indicator placed near a midpoint of an aperture for attaching.

15. The cable rack of claim 10, further comprising a locking spring for securing the rack arm.

16. The cable rack of claim 10, wherein the at least one stanchion and the at least one arm are molded from reinforced plastic.

17. The cable rack of claim 10, wherein the stanchion further comprises at least one recess or aperture for attaching a cable tie.

18. The cable rack of claim 10, further comprising at least one joining tab projecting from one of a top portion and a bottom portion of the stanchion and at least one mating slot in the other of the top portion and the bottom portion of the stanchion.

19. A cable rack molded from plastic, the cable rack comprising:
    at least one rack arm with vertically-spaced brackets; and
    at least one stanchion, at least two apertures for attaching the stanchion, and at least two holding apertures for holding the at least one rack arm, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures.

20. The cable rack of claim 19, further comprising male and female joining portions at a top and a bottom of the stanchion.

21. The cable rack of claim 19, wherein the at least one rack arm comprises a single rack arm with two brackets for attaching to the at least one stanchion, at least one of the brackets comprising a feature for an interference fit with the apertures for holding the arm.

22. The cable rack of claim 19, wherein at least one of the brackets comprises a projection for an interference fit with the apertures.

23. The cable rack of claim 19, wherein the stanchion further comprises a visual indicator that the arm has been properly seated into the stanchion.

24. The cable rack of claim 19, wherein the at least one stanchion further comprises at least one visual indicator for trimming a length of the stanchion.

25. The cable rack of claim 19, wherein the at least one stanchion has two apertures for holding for each aperture for attaching, except for a top-most aperture for attaching having a single aperture for holding.

26. The cable rack of claim 19, wherein the at least one rack arm further comprises a lip for retaining a load on the rack arm.

27. The cable rack of claim 19, further comprising a locking spring for securing the at least one rack arm, and wherein the at least one stanchion further comprises pockets for receiving barbs on the locking spring.

28. The cable rack of claim 19, wherein the apertures for holding are spaced equally in a single stanchion and in more than one stanchion.

29. The cable rack of claim 19, wherein the at least one stanchion further comprises at least one recess for attaching a cable tie.

30. The cable rack of claim 29, wherein a height of the recess is sized a width of the cable tie or a width of a head of the cable tie.

31. The cable rack of claim 19, further comprising a locking spring for securing the at least one rack arm.

32. The cable rack of claim 19, wherein one of the apertures for attaching is located near a top of the at least one stanchion.

33. The cable rack of claim 19, wherein at least one of the at least two apertures for attaching is recessed.

34. The cable rack of claim 19, wherein the at least one stanchion comprises two stanchions, the rack arm comprises two vertically-spaced brackets and is assembled with one bracket in each stanchion, and at least one aperture for attaching from at least one of the stanchions is located between the two brackets.

35. A cable rack molded from plastic, the cable rack comprising:

at least one rack arm with vertically-spaced brackets; and at least one stanchion having at least two apertures for attaching the stanchion and at least two holding apertures for holding the at least one arm, the at least one stanchion having two apertures for holding for each aperture for attaching, except that a single aperture for attaching has a single aperture for holding, and wherein all holding apertures are equidistant from each other.

36. The cable rack of claim 35, wherein the single aperture for attaching with a single aperture for holding is located near a top of the stanchion.

37. A cable rack molded from plastic, the rack comprising:

at least one rack arm; and at least one stanchion having at least two apertures for attaching and at least two apertures for holding the at least one rack arm, wherein when the at least one rack arm is installed in the at least one stanchion, a space between an upper surface of the rack arm and an upper surface of the aperture for holding is equal to a width of a cable tie or a width of a head of a cable tie.

38. The cable rack of claim 37, wherein the stanchion further comprises at least one recess or aperture for attaching a cable tie.

39. The cable rack of claim 37, wherein one of the apertures for attaching is located near a top of the at least one stanchion.

40. A cable rack comprising:

at least one stanchion having at least two apertures for attaching and at least two apertures for holding, wherein a distance from an upper side of a top-most holding aperture and a top surface of the stanchion, and a distance from a top surface of a lowest holding aperture to a bottom surface of the stanchion is equal to a distance between corresponding surfaces of two adjacent holding apertures.

41. The cable rack of claim 40, further comprising at least one recess or aperture for attaching a cable tie.

* * * * *